Aug. 4, 1936.  W. B. KLEMPERER  2,050,186
STRAIN GAUGE
Filed Oct. 1, 1932  4 Sheets-Sheet 1
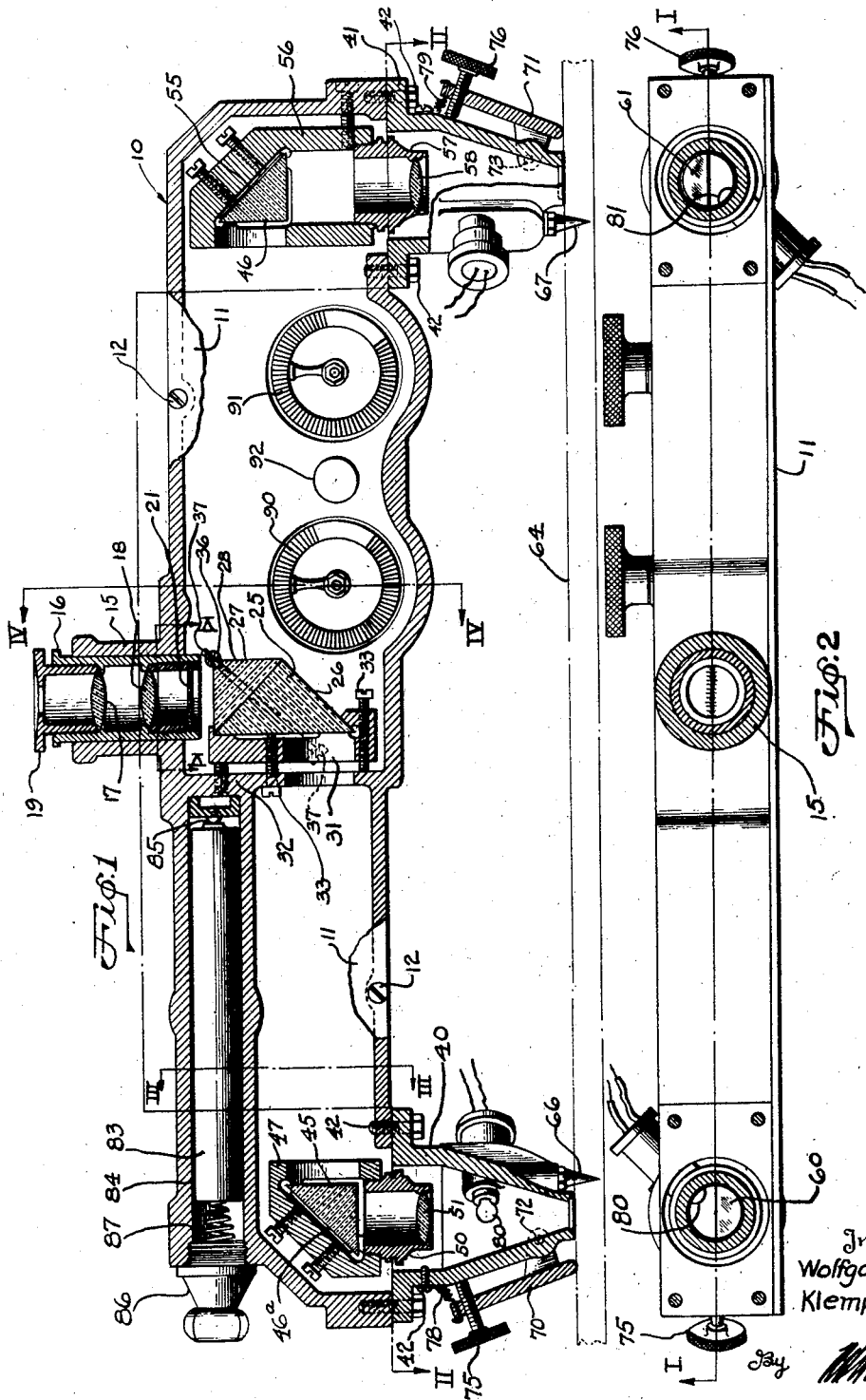
Inventor
Wolfgang B. Klemperer
By
Attorney

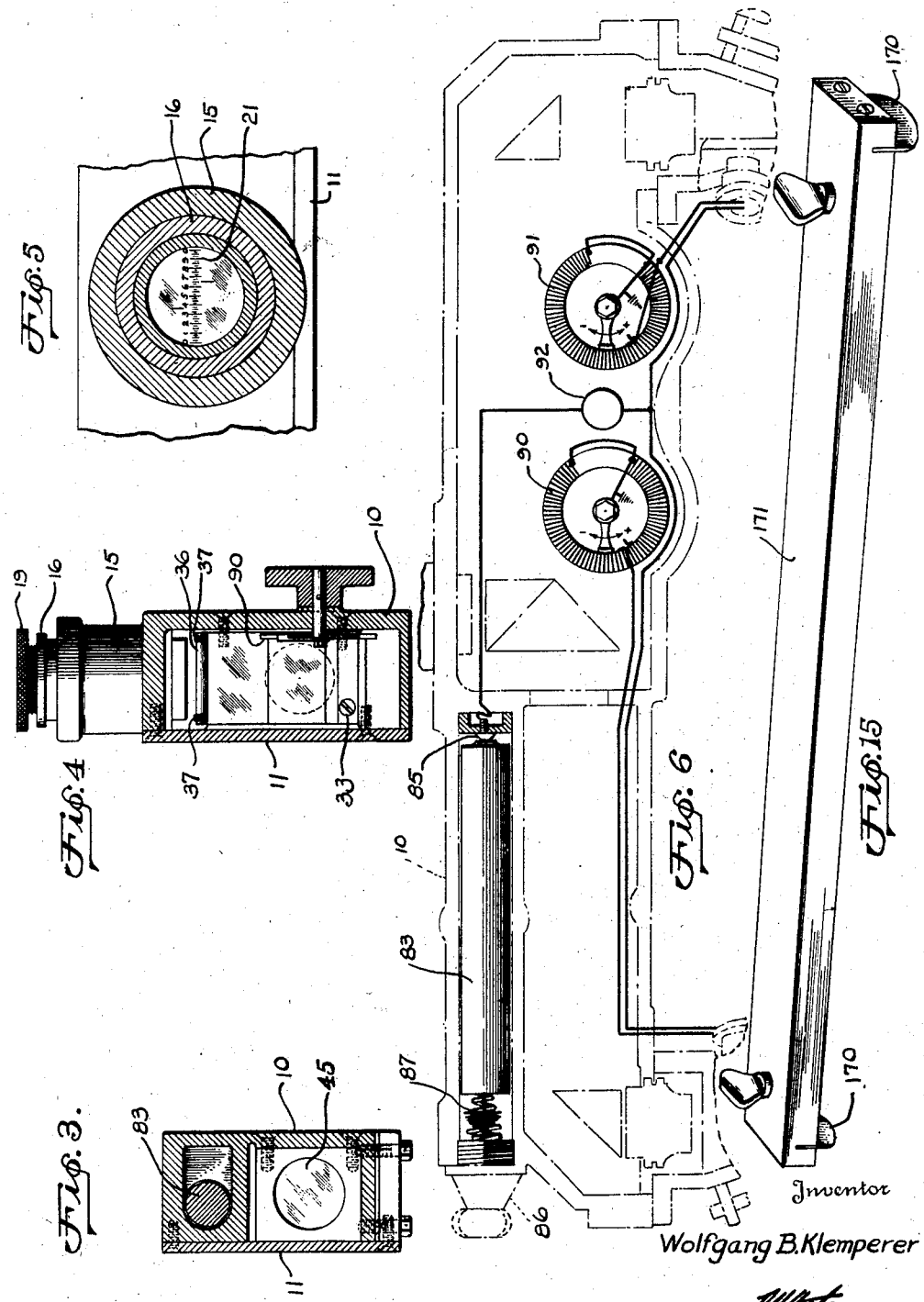

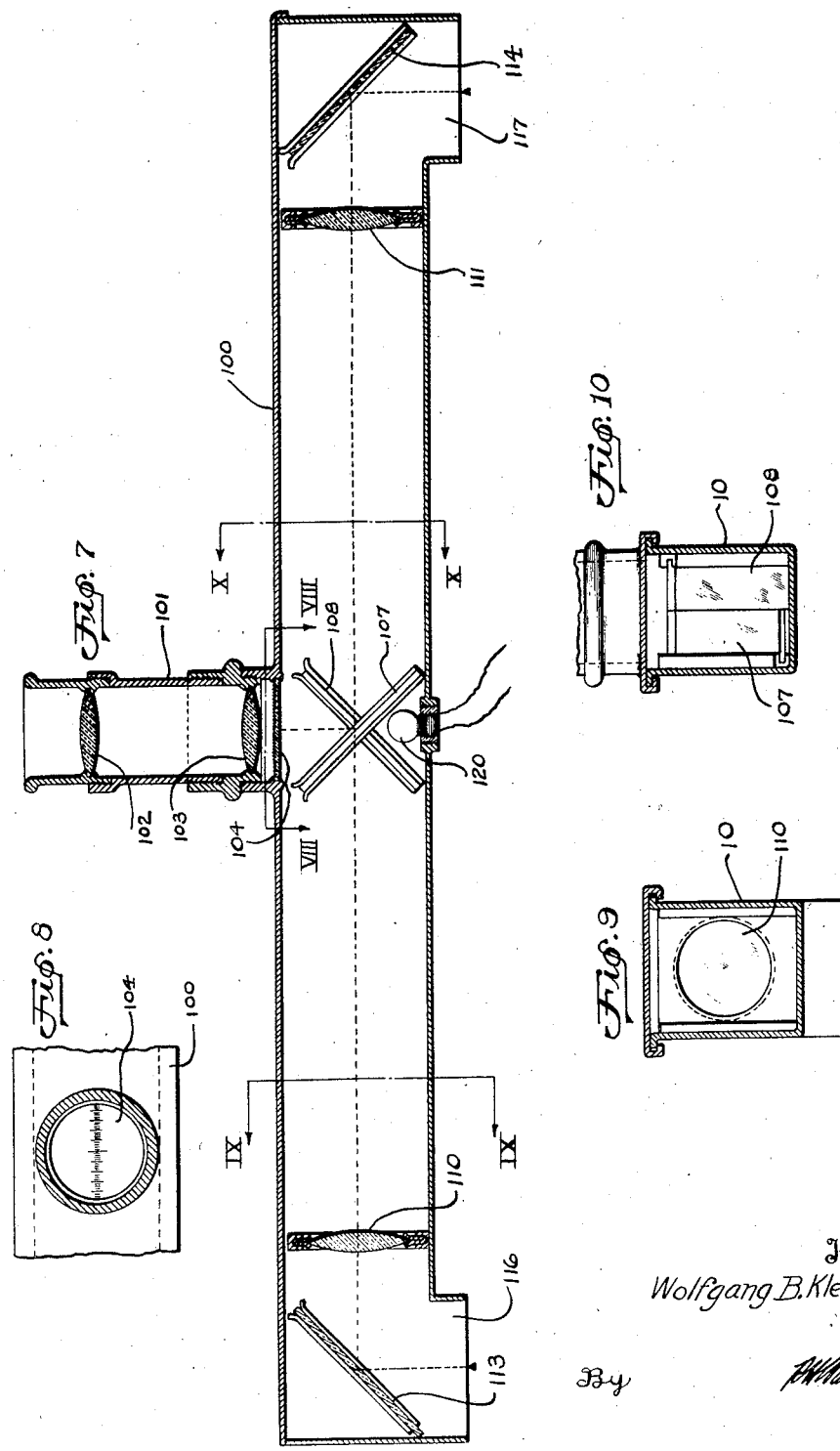

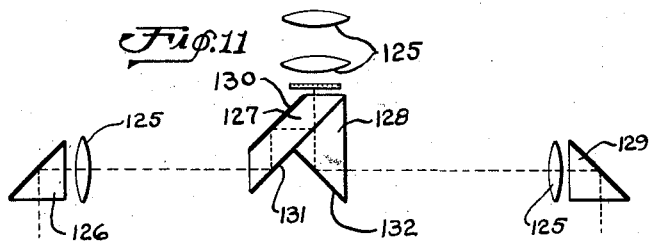
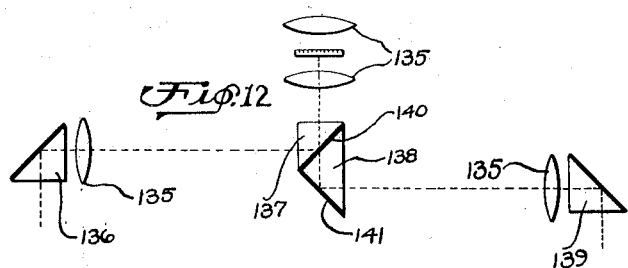
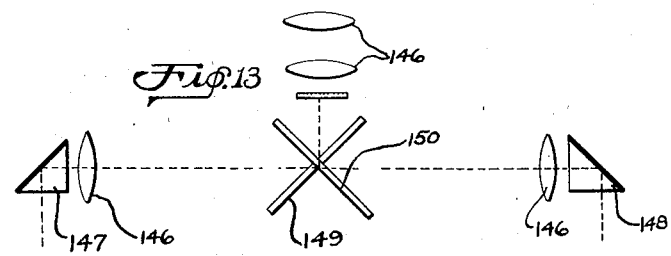
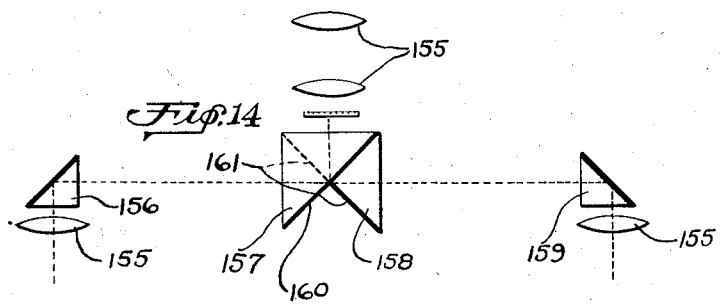

Patented Aug. 4, 1936

2,050,186

UNITED STATES PATENT OFFICE 2,050,186

STRAIN GAUGE

Wolfgang B. Klemperer, Akron, Ohio, assignor to Goodyear-Zeppelin Corporation, Akron, Ohio, a corporation of Delaware Application October 1, 1932, Serial No. 635,783

9 Claims. (Cl. 88—14)

This invention relates to apparatus for testing and measuring the stresses applied to various members and the strains received thereby, and more particularly refers to a portable optical instrument for performing these functions.

Prior to the present invention it has been difficult or impossible to measure true or absolute stresses and strains applied to or carried by members in various structures such as bridges, buildings, frameworks, and particularly airship frameworks. This has been because, in redundant structures, the very assembly of the parts puts unknown stresses into the members and once the various structural members are assembled or secured together it is impossible to determine the particular stress or strain carried thereby inasmuch as it is usually impractical to apply strain gauges before assembly and to leave them on during the same. This is mainly due to the fact that strain gauges heretofore available were capable of measuring only stress changes and not absolute or true strain. It becomes necessary, if an experimental determination is desired, to actually remove one or more structural members or parts thereof and to thereafter insert or apply the testing or gauging mechanism. Prior known apparatus for measuring absolute distances so accurately on a specimen that its stresses and strains can be derived therefrom have been comparatively heavy, which fact renders the same of a semi-non-portable construction. Again, by former known mechanical gauging devices it has usually been necessary to secure the device in some manner to the member to be tested, which fact raises various difficulties due to the varying shapes of the members to be tested, and also limited access in complicated structures because of the delicate nature of most of the instruments the same are liable to be damaged by inevitable traffic or observers or rough usage or service of the structure under test.

Again by former known practices the measuring of stresses and strains in all bodies has been a comparatively delicate and exacting procedure involving considerable skill on the part of the operator with an additional requirement of being able to properly calculate and determine the strains from the data obtained.

It is an object of the present invention to avoid and overcome the difficulties encountered in prior practices and by prior known apparatus by the provision of a light weight, portable device for rapidly and easily determining the stress or strain in various members.

Another object of the invention is to provide a portable optical gauge which can be handled by a comparatively inexperienced operator to determine forces applied to or stresses carried by any particular member.

Another object of the invention is to provide an instrument for indicating the stress or strain applied to structural members under varying or constant loads while and after they are being used in operation or tests, without necessitating any removal thereof or any breaking or cutting of the structure itself.

Another object of the invention is to provide a testing device for determining the forces or stresses carried by any desired member or strain present therein, which device is adapted to be placed or held against the member without fastening to allow a quick sight reading to be taken.

The foregoing and other objects of the invention are achieved by an instrument having microscopic lenses adapted to sight on marks applied to a specimen member whereby the particular strain change that occurred in said member since application of the marks can be determined by measuring the apparent change in distance between the marks on the member.

Thus the principle embodied in the new device consists in optically gauging the distance of two fine marks previously applied to the specimen while it was under no load or under a known condition of stress. The optical apparatus according to the invention comprises an eye-piece in which an image of both marks are caused adjacent to each other together with a phantom scale so that the apparent distance, gauged by the scale divisions appearing to separate the two marks, is read as indicative of the relative change of distance of the two marks. The marks are made with a tool so long that unless a change of strain has taken place the two images coincide. The coincidence of images is brought about by a system of mirrors or prisms and the necessary accuracy and magnification is obtained by so distributing lenses into each system of light rays as to form a twin objective microscope. Thus the parallax of the gauge length is compensated by the instrument but the microscopic variation of this parallax is measured on the reticule scale embodied in the instrument system. Illumination of gauge marks is incorporated in the instrument.

The apparatus is illustrated in the accompanying drawings wherein:

Fig. 1 is a longitudinal cross-sectional view through a testing device embodying the principles of the invention taken on line I—I of Fig. 2;

Fig. 2 is a cross-sectional view of the device illustrated in Fig. 1 taken on line II—II of Fig. 1;

Fig. 3 is a transverse sectional view taken on line III—III of Fig. 1;

Fig. 4 is a transverse sectional view similar to Fig. 3, taken on line IV—IV of Fig. 1;

Fig. 5 is a cross-sectional view taken on line V—V of Fig. 1;

Fig. 6 is a wiring diagram of the illuminating means forming a part of a testing device comprising the present invention;

Fig. 7 is a longitudinal vertical sectional view of a modified form of the invention;

Fig. 8 is a cross-sectional view taken on line VIII—VIII of Fig. 7, illustrating the measuring scale forming a part of the device shown in Fig. 7;

Fig. 9 is a transverse sectional view taken on line IX—IX of Fig. 7;

Fig. 10 is a transverse sectional view similar to Fig. 9 and taken on line X—X of Fig. 7;

Figs. 11 and 12, 13 and 14 diagrammatically illustrate other arrangements of the lenses and prisms employed in the testing device comprising the present invention; and Fig. 15 is a perspective view of the gauge length marking means employed with the testing device.

It will be appreciated that the principles comprising the present invention can be embodied in a number of different relations. However, the preferred form of the invention is illustrated in Figs. 1 to 6. The device shown in these figures comprises a cast frame or box of light metal indicated generally at 10, which is preferably U-shaped in cross-section, with a cover plate 11 secured to the frame 10 by suitable means such as screws 12, which cover normally closes the box or frame 10. Opened centrally of the frame 10 and normally formed integrally therewith is a hollow hub or boss 15 which removably receives a tube 16 in which a pair of microscopic lenses 17 and 18 are secured by suitable means which may include an eye-piece 19. A scale of some character having suitable graduations thereon is also provided in the tube 16 in the focal plane of the lenses. The scale is preferably marked upon an auxiliary glass disc such as that indicated at 21, which disc is fastened in the lower end of the tube 16 or between the lenses.

Positioned immediately below the tube 16 carrying the microscopic lenses 17 and 18 are some means for turning the light rays from the axis of the tube 16 at right angles and in opposite directions thereto. These means can take a plurality of forms. However, it has been found that prisms function very efficiently in this respect and prisms have been incorporated in the preferred form of the invention. These prisms comprise a large, triangular prism 25 having its inclined surface 26 heavily silvered to provide a mirror surface and having its upper inclined surface 27 semi or partially silvered so that certain of the light rays will pass through while certain others will be reflected therefrom. Mounted upon the surface 27 of the prism 25 is an additional smaller prism 28 which is ordinarily fastened against the surface 27 of the prism 25 immediately after the semisilvering operation of this surface.

The prisms may be mounted by any suitable means, which means may take the form of a clamp 31 secured to suitable webs 32 formed integral with the frame or box 10, by adjustable screws 33. A transverse bar 36 suitably grooved to fit upon the upper corner of the prism 28 is provided at its ends with threaded holes to receive long screws 37, which means serve to hold the prisms in the clamp 31.

The sides or bottom of the box or frame 10 opposite the hub 15 are provided at the ends with suitable apertures which are substantially covered by funnel shaped members 40 and 41, the same being secured to the frame by screws 42 or similar means. Mounted in the ends of the frame or box 10 are additional means for reflecting the light rays through the hub members and back to the centrally positioned prisms and microscopic eye-piece, which means in the present embodiment of the invention comprises prisms 45 and 46. The prism 45 is beveled and silvered upon its surface 46ª and is clamped in position by a clamping member 47 so that it is in substantial alinement with the silvered surface 26 of the prism 25 and also in alinement with the axis of the funnel member 40. Mounted upon the bottom of the clamping member 47 through the agency of means such as the tube 50 is an objective lens 51. It will be understood that the relation of the lens 51, the prism 45, the prism 25, and the microscopic lenses 17 and 18 is such that an observer looking through the eye-piece 19 can observe microscopically any marks or the like at the end of the funnel member 40.

Referring now to the prism 46 which has a silvered surface 55, it will be evident that suitable means are provided for mounting the prism in the end of the box or frame 10 in alinement with the semi-silvered surface 27 of the prisms 25 and 28 and also in axial alinement with the funnel member 41. These means may provide a clamping member 56 having a tube 57 secured in the bottom thereof which serves to mount objective lens 58. It will be understood that the relation of the lens 58, the prisms 46, 28, and the microscopic lenses 17 and 18, is such that an observer looking through the eye-piece 19 will see any objects or marks placed at the opening in the bottom of the funnel member 41 microscopically enlarged. The funnel members 40 and 41 are provided with semicircular apertures placed on opposite sides of the funnel members as illustrated in Fig. 2 of the drawings. These semicircular apertures are formed in the ends or bottoms of the funnel member due to the semicircular webs indicated by the numerals 60 and 61 which close off half of the apertures.

It will be understood that the strain gauge when in use is placed down upon the surface of the specimen to be tested, such as that indicated in dotted lines by the numeral 64 in Fig. 1, so that the lower ends of the funnel members are placed directly against the specimen gauge marks formed thereon, as hereafter explained. In order to insure that the testing device will be properly and uniformly positioned with respect to the test specimen, positioning means are ordinarily incorporated therewith. These means may take the form of posts 66 and 67 secured to suitable bosses formed in the funnel members 40 and 41. The posts 66 and 67 normally rest against the side of the specimen tested and serve to position the testing device laterally with respect to the specimen and function to steady the instrument during the testing operation.

In addition to the posts 66 and 67 some means are generally provided for adjusting the distance of the instrument above the surface of the test specimen, in order to properly focus upon the marks engraved on said surface. In the drawings these means are illustrated as comprising members 70 and 71 pivotally secured as at 72 and 73 to the funnel members 40 and 41. Adjusting screws 75 and 76 extend through suitably tapped holes in the ends of the members 70 and 71 and acting against the tension of springs 78 and 79 determine the angular position of the members 70 and 71 whereby the bottom openings of the funnel members 40 and 41 can be moved toward and away from the test specimen 64.

In order to ensure that the position of the marks or surfaces positioned below the funnel members 40 and 41 can be accurately seen and determined under all conditions, illuminating means, such as electric bulbs 80 and 81, are provided internally of the funnel members. The electric bulbs are energized through the agency of a suitable source of electric current which means preferably takes the form of a light weight battery cell 83 positioned in a recess 84 formed in the box or frame 10. The battery cell 83 is held in the recess 84 and against the insulated contact 85 by a block 86 having incorporated therewith a spring 87 contacting with and grounding the one side or end of the battery cell. In order to control the brilliancy of the illuminating light bulbs, rheostats 90 and 91 are provided, and in addition a switch 92 which permits the bulbs to be turned completely on and off is secured to the side of the box or frame 10. Reference may be had to Fig. 6 for a more complete illustration of the wiring diagram of the bulbs, battery and rheostats, which diagram is self explanatory.

It has been found that the direction in which the illuminating light rays impinge upon the marks on the specimen has a controlling influence upon the contrast between light and shadow or glare produced on the walls and bottom of the microscopic groove left by the marking tool. Although the best light bulb arrangement depends on the shape of the tool and also on the nature of the surface of the specimen, which may be metallic, painted, crystalline, amorphous or fibrous, it has been found that a slant location of the light bulb filament with respect to the dividing line of the semicircular aperture has certain contrast advantages and this is therefore the location shown on the drawings picturing the preferred form of the instrument.

A modified form or embodiment of the invention illustrated in Figs. 7 to 10 comprises a tubular frame 100 having a centrally positioned tube 101 secured thereto, which tube mounts microscopic lenses 102 and 103, as well as an indicating scale or reticule 104. Positioned in the tubular framework 100 beneath the tubular eye-piece 101 are a pair of mirrors 107 and 108. As illustrated in Fig. 10, the mirrors are placed at right angles to each other, each filling half of the tubular framework 100 so that light rays or lines of vision extending through the eye-piece 101 will be reflected and turned along the tubular framework 100 in opposite directions.

Objective lenses 110 and 111 are mounted in the framework 100 near the opposite ends thereof with additional mirrors 113 and 114 positioned at the ends of the framework 100 in vertical alinement with apertures 116 and 117 which are positioned over marks in the test specimen as hereafter more fully explained. The light source, such as the electric bulb 120, is provided beneath the mirrors 107 and 108 and functions to illuminate the surfaces or marks to be scrutinized through the testing device.

It will be evident that the relation of the microscopic lenses and the objective lenses, and also the relation of the reflecting prisms or mirrors, can be widely varied and can take a plurality of forms to produce or achieve the desired result, and by way of example Figs. 11 and 14 show certain of these relations. In Fig. 11, for example, lenses are indicated by the numeral 125, while prisms are indicated by the numerals 126, 127, 128 and 129. The prisms 126 and 129 are similar to those employed in similar relations and described above with respect to Figs. 1 to 6 of the drawings. Prism 127 is, however, semisilvered on the surface with which it contacts with prism 128, and is fully silvered upon the surfaces marked 130 and 131. The prism 128 is silvered on the surface marked 132. With respect to Fig. 12, the lenses are indicated by the numeral 135, while the prisms are indicated at 136, 137, 138 and 139. Prisms 136 and 139 are similar to those described with respect to Figs. 1 to 6 of the drawings. Prism 137 is semisilvered on its surface 140, that is the surface that contacts with the prism 138 while prism 138 is silvered upon its edge 141.

Fig. 13 illustrates lenses 146, while the numerals 147 and 148 indicate prisms, and the numerals 149 and 150 mirrors. The mirrors 149 and 150 are similar to those described heretofore with respect to Figs. 7 to 10 of the drawings, while the prisms 147 and 148 are similar to those described above with respect to Figs. 1 to 6 of the drawings.

In Fig. 14 the lenses are indicated by the numerals 155, while the numerals 156 to 159 indicate the optical prisms. The prisms 156 and 159 are similar to those described and illustrated in Figs. 1 to 6 of the drawings. However, prisms 157 and 158 are prisms only half as thick as the casing in which they are incorporated, said prisms being silvered on their surfaces 160 and 161 so that they function in substantially the same manner as the mirrors described heretofore in conjunction with Figs. 7 to 10.

It is believed that the operation of the device will be substantially understood from the foregoing description. However, a brief résumé thereof follows:

The member or specimen to be tested to determine the stress or strain thereof is marked with a suitable instrument such as that illustrated in Fig. 15, which provides marks or cuts upon the surface of the member or specimen a set or determined distance apart. An instrument of this type may comprise for example a pair of razor blades 170, or the like, securely clamped upon a bar 171 a fixed distance apart. This bar is preferably made of the same material or material having the same thermal expansion coefficient as the frame of the gauge. The marks are applied to the surface of the test specimen or member by placing the bar 171 carrying the razor edges against the same and rocking the bar to mark the specimen or member. This marking operation is preferably performed while the specimen or member is under no load, or at least under a known condition of loading. Thereafter the marked member may be built into any structure or the specimen may be subjected to any strains or stresses. The optical gauge is then applied over the marks on the test specimen or member when it is subject to loads, with the illuminating means in the testing device turned on and the rheostats adjusted to properly illuminate the marks on the specimen or member, which of course are positioned below the openings in the ends of the funnel members.

The relation of the instrument and its lenses is such with respect to the original gauge length marks applied to the specimen or member when under no load that the marks on the specimen as observed through the testing device will be in substantial alinement with each other. However, when the test specimen or member is subjected to any strain the member or specimen will be elongated or compressed so as to change the distance between the gauge marks which can be immediately observed or determined by sighting through the eye-piece 19 and observing the distance that the respective gauge marks have moved away from each other upon the scale 21. This change in the relative position of the gauge marks as illustrated in Fig. 5 permits the stress or strain carried by the test specimen or member to be readily determined and read in terms of the apparent scale distance between the two mark images. The scale is calibrated in terms of strain by calculation of the optical magnification or, if preferred, by experimental observation of a known scale instead of the specimen. If the elastic modulus of the specimen is known the strain values can be converted into stress values. Where a great number of pieces of similarly proportioned members are employed in structural work, as is the case in the construction of rigid airships, it is possible to mark the members prior to their insertion in the structure and to thereafter determine at any future time the load carried by any particular member under any existing conditions. For example, the present instrument has been designed to measure the stress upon duralumin girders used in airship construction, in which case the scale in apparent millimeters indicated a stress of one thousand pounds per square inch upon the Duralumin for one millimeter variation of the gauge mark images upon the scale. Inasmuch as the yield point of Duralumin is of the order of forty thousand pounds per square inch, it was readily possible to determine the stress carried by any particular girder under actual assembly, load, test and flight conditions of the rigid airship. It is quite easy to determine whether the stress is caused by tension or compression in that the marks move in opposite directions with respect to each other for the different stresses.

The magnifying power of the grouped microscopic lenses can be widely varied as will be apparent. However, a magnification of from twenty to fifty is ordinarily employed and in practice has been found quite satisfactory. Again, the position, use, and brilliancy of the light means can be widely varied without departing from the principles of the invention. Also, the scale incorporated in the device can be formed as part of or relocated with respect to any of the lenses, or for that matter of the prisms, and can be calibrated in any suitable manner to perform or obtain the desired result.

One of the advantages of the present instrument is that it is not necessary to so apply it that the marks appear in the center of the field of vision or that one of them appears at the scale zero. On the contrary any part of the scale can be utilized to gauge the apparent distance of the marks. Thus it suffices to hold the gauge in hand approximately on the gauge marks so that the latter appear in the field of vision.

As stated above, it will be understood that the exact relation of the magnifying lenses and of the prisms and mirrors can be widely varied by the skilled optician to obtain the same result achieved by the present invention. Moreover, the particular means for mounting the prisms and lenses can be changed as can the particular shape and structure of the box or frame in which they are mounted.

It will also be understood that various means for positioning the gauge with respect to the test specimen or member can be employed and that the gauge can be adapted to contact directly against the specimen or member or otherwise, as best fitted for the particular application in which it is being employed. If desired, the funnel members may be provided with circular openings at their ends rather than semicircular openings, and moreover, the openings can be increased in size if this is found desirable.

The invention contemplates replacing the battery cell 83 with an outside or auxiliary battery, in which case a plug having wires extending to the battery replaces the battery cell in its compartment serving to close the circuit with the battery connected in the same. It is also possible to entirely dispense with the battery cell 83 and to employ an auxiliary battery connected directly to the light sources with rheostat control incorporated with the outside battery rather than with the instrument itself.

The invention also contemplates covering the ends or the entire frame 10 with asbestos fabric or the like to prevent temperature changes or the heat of the operators' hands from causing inaccuracies due to the thermal change in length of the frame 10. In this respect, the metal parts of the instrument are preferably built of the same material as the test specimen for which it is intended. In case of specimens varying considerably, the gauge and marking tool may be made of a material which is little affected by ordinary changes in temperature and due allowance for thermal expansion can then be rapidly made.

While, in accordance with the patent statutes the best known forms of the invention have been illustrated and described, it is intended that the scope of the present invention be not limited by these disclosures, but be defined by the appended claims.

What I claim is:

1. In a device for determining the stresses and strains applied to a member, which member has been provided with spaced marks while under no load or while under a known load, a hollow frame, a microscopic eye-piece positioned intermediate the ends of said frame, means associated with the eye-piece and contained within the frame for reflecting light rays from the eye-piece along the inside of the frame towards the opposite ends thereof and vice versa, lenses secured adjacent the ends of the hollow frame opposite of the eye-piece and adapted to be positioned over said marks, means associated with the lenses for reflecting light rays to the first-named reflecting means, means for obscuring a portion of one of said marks and an opposite portion of the other of said marks so that said marks while in their initial positions will appear in the eye-piece, each in substantially half thereof and in a coincident relation a scale associated with the eye-piece and being arranged to indicate the amount of strain or stress when said marks are viewed through the eye-piece in other than their initial positions, and means adapted to contact with the member for positioning the device.

2. A device for measuring the change in distance between two marks on a member comprising a microscopic eye-piece, means for optically bringing the marks to the eye-piece, means for shielding opposite areas of the optical means so that the marks will be visible each in substantially half of the eye piece, a scale associated with both of the opposite areas of the eye-piece for measuring the change in position of the marks, means contained entirely in the device for individually illuminating the marks, means for individually controlling the intensity of the illuminating means, means on the device adapted to engage the member to position the device laterally with respect to the member, and other adjustable means on the device adapted to contact with the member to position the device from the surface of the member.

3. A device for measuring the change in distance between two marks on a member comprising a microscopic eye-piece, means for optically bringing the marks to the eye-piece, means for shielding opposite areas of the optical means so that the marks will be visible each in substantially half of the eye-piece, a scale associated with the eye piece for measuring the change in position of the marks, means for individually illuminating the marks, means for individually controlling the intensity of the illuminating means, and means on the device adapted to engage the member to position the device with respect to the member.

4. A device for measuring the change in distance between two marks on a member comprising an eye-piece, means for optically bringing the marks to the eye-piece, means for shielding opposite areas of the optical means so that the marks will be visible each in substantially half of the eye piece, a scale associated with each half of the eye-piece for measuring the change in position of the marks, means for individually illuminating the marks and means for individually controlling the intensity of the illuminating means.

5. A device for measuring the change in distance between two marks on a member comprising a microscopic eye-piece, means for optically bringing the marks to the eye-piece, means for shielding opposite areas of the optical means so that the marks will be visible each in substantially half of the eye-piece, a scale associated with the eye-piece for measuring the change in position of the marks, and means contained entirely in the device for individually illuminating the marks.

6. A device for measuring the change in distance between two marks on a member comprising an eye-piece, means for optically bringing the marks to the eye-piece, means contained entirely in the device for individually illuminating the marks, means for individually controlling the intensity of the illuminating means, means on the device adapted to engage the member to position the device laterally with respect to the member, and other adjustable means on the device adapted to contact with the member to position the device from the surface of the member.

7. A device for measuring the change in distance between two marks on a member comprising a microscopic eye-piece, means for optically bringing the marks to the eye-piece, means for shielding opposite areas of the optical means so that the marks will be visible each in substantially half of the eye-piece, a scale associated with the eye-piece for measuring the change in position of the marks, means on the device adapted to engage the member to position the device laterally with respect to the member, and other adjustable means on the device adapted to contact with the member to position the device from the surface of the member.

8. A strain gauge for measuring relative movement between spaced indicia on a part to be tested, comprising a casing having at least two openings spaced longitudinally thereof, a microscopic eye piece arranged on said casing, an optical system so constructed and arranged as to project images of indicia in front of each of said openings to said eye piece, but on different adjacent areas of said eye piece lying on opposite sides of the same portion of a line substantially parallel to a line drawn between said openings, whereby to provide upper and lower areas having projected images from different ones of said openings, said optical system being so constructed and arranged that the images projected on said areas move in a direction parallel to the division line therebetween as the indicia move to and from each other when a strain is being placed on the part to be tested, and a scale in said eye-piece for measuring the relative movement of said images and consequently of said indicia.

9. A device for measuring the change in distance between two marks on a member comprising a microscopic eye piece, means for optically bringing the marks to the eye-piece, means for shielding opposite areas of the optical means so that the marks will be visible each in substantially half of the eye piece, a scale associated with the eye piece for measuring the change in position of the marks, and means contained entirely in the device for individually illuminating the marks, said means for optically bringing the marks to the eye piece comprising means for arranging said marks in said eye piece on opposite sides of a line substantially parallel to a line drawn between said marks, whereby upon shifting movement of said marks their images in said eye piece move parallel to each other, whereby the amount of shifting movement in either direction relative to each other can be measured on said scale.

WOLFGANG B. KLEMPERER.